United States Patent
Overstreet et al.

(10) Patent No.: US 10,077,638 B2
(45) Date of Patent: Sep. 18, 2018

(54) DOWNHOLE TOOLS HAVING HYDROPHOBIC COATINGS, AND METHODS OF MANUFACTURING SUCH TOOLS

(71) Applicant: Baker Hughes Incorporated, Houston, TX (US)

(72) Inventors: James L. Overstreet, Tomball, TX (US); Vivekanand Sista, The Woodlands, TX (US); Bo Yu, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 873 days.

(21) Appl. No.: 14/496,124

(22) Filed: Sep. 25, 2014

(65) Prior Publication Data
US 2016/0090824 A1 Mar. 31, 2016

(51) Int. Cl.
*B32B 5/14* (2006.01)
*E21B 41/02* (2006.01)
(Continued)

(52) U.S. Cl.
CPC .............. *E21B 41/02* (2013.01); *B23K 10/02* (2013.01); *C23C 4/10* (2013.01); *C23C 4/124* (2013.01);
(Continued)

(58) Field of Classification Search
CPC ......... B23K 10/02; C23C 10/28; C23C 26/02; C23C 4/10; C23C 4/124; C23C 4/127;
(Continued)

(56) References Cited

U.S. PATENT DOCUMENTS 3,547,673 A    12/1970   Bredzs et al.
4,075,392 A *   2/1978   Jaeger .................... B23K 35/30
                                                        427/236
(Continued)

FOREIGN PATENT DOCUMENTS

| EP | 1443125 A1 * | 8/2004 | ............... C23C 4/06 |
|----|--------------|--------|---|
| EP | 1995344 A1 | 11/2008 | |
| WO | 2012160444 A2 | 11/2012 | |

OTHER PUBLICATIONS

Valencia et al., ASM Handbook—Thermophysical Properties, 2008. ASM International, vol. 15, pp. 468-481.*
(Continued)

*Primary Examiner* — David R Sample
*Assistant Examiner* — Elizabeth Collister
(74) *Attorney, Agent, or Firm* — TraskBritt

(57) ABSTRACT

A downhole tool for use in wellbores comprises a layer of hydrophobic material over a body, wherein the layer of hydrophobic material comprises a transition metal boride having a higher hydrophobicity than the body. The downhole tool may comprise a body having a composition and the layer of hydrophobic material comprising a discontinuous phase of the transition metal binder dispersed within a first continuous phase comprising a metal binder. The layer of material may be chemically bonded to the body. An interface between the body and the layer of material may comprise the transition metal boride dispersed within a second continuous phase comprising the metal binder and the composition of the body. Methods of forming downhole tools include forming such a layer of material at a surface of a body of a downhole tool.

16 Claims, 4 Drawing Sheets

(51) Int. Cl.
*C23C 4/12* (2016.01)
*C23C 26/02* (2006.01)
*E21B 3/00* (2006.01)
*E21B 10/46* (2006.01)
*E21B 17/10* (2006.01)
*E21B 34/06* (2006.01)
*B23K 10/02* (2006.01)
*C23C 4/10* (2016.01)
*C23C 10/28* (2006.01)

(52) U.S. Cl.
CPC ............. *C23C 4/127* (2013.01); *C23C 10/28* (2013.01); *C23C 26/02* (2013.01); *E21B 3/00* (2013.01); *E21B 10/46* (2013.01); *E21B 17/1078* (2013.01); *E21B 17/1085* (2013.01); *E21B 34/06* (2013.01)

(58) Field of Classification Search
CPC .. E21B 10/46; E21B 17/1078; E21B 17/1085; E21B 34/06; E21B 3/00; E21B 41/02
USPC ............................................ 428/610; 175/57
See application file for complete search history.

(56) References Cited

U.S. PATENT DOCUMENTS

| | | | |
|---|---|---|---|
| 5,981,081 A * | 11/1999 | Sue | ............ C23C 4/06 428/564 |
| 6,450,271 B1 | 9/2002 | Tibbitts et al. | |
| 2008/0145649 A1 * | 6/2008 | Mannem | .............. C10M 111/00 428/336 |
| 2009/0004379 A1 * | 1/2009 | Deng | ........................ C23C 4/04 427/203 |
| 2010/0279023 A1 | 11/2010 | Kusinski et al. | |
| 2011/0042069 A1 | 2/2011 | Bailey et al. | |
| 2012/0205162 A1 | 8/2012 | Patel et al. | |
| 2013/0045334 A1 * | 2/2013 | Seals | .................... B23K 35/325 427/446 |
| 2013/0056363 A1 | 3/2013 | Timur et al. | |
| 2013/0171367 A1 | 7/2013 | Kusinski et al. | |
| 2013/0224516 A1 | 8/2013 | Kusinski et al. | |

OTHER PUBLICATIONS

Calphad.com, Cobalt-Chromium Phase Diagram <http://www.calphad.com/pdf/Co_Cr_Phase_Diagram.pdf> (accessed Jan. 9, 2018) (Year: 2008).*

Sista et al., U.S. Appl. No. 14/187,124 titled, Downhole Tools Having Hydrophobic Wear and Erosion Resistant Coatings, and Methods of Manufacuring such Tools, filed Feb. 21, 2014.

International Preliminary Report on Patentability from PCT International Application No. PCT/US15/51942, issuance of report dated Mar. 28, 2017, 12 pages.

International Search Report from PCT International Application No. PCT/US15/51942, dated Dec. 9, 2015, 3 pages.

International Written Opinion from PCT International Application No. PCT/US15/51942, dated Dec. 9, 2015, 11 pages.

Canadian Office Action for Canadian Application No. 2,962,599 dated Jan. 22, 2018, three pages.

European Search Report from European Patent Application No. 15845210 dated May 18, 2018 (8 pages).

* cited by examiner

DOWNHOLE TOOLS HAVING HYDROPHOBIC COATINGS, AND METHODS OF MANUFACTURING SUCH TOOLS

TECHNICAL FIELD

Embodiments of the disclosure relate generally to downhole tools used during drilling, completion, and production phases of, for example, obtaining hydrocarbons from a producing formation within a subterranean wellbore. More particularly, embodiments of the disclosure relate to downhole tools having coatings formulated to reduce scale buildup and balling while maintaining wear and erosion-resistance and having a high bonding strength to the underlying base material, and to methods of forming such downhole tools.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using a drill bit such as, for example, an earth-boring rotary drill bit. Different types of earth-boring rotary drill bits are known in the art including, for example, fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters). The drill bit is rotated and advanced into the subterranean formation. As the drill bit rotates, the cutters or abrasive structures thereof cut, crush, shear, and/or abrade away the formation material to form the wellbore. A diameter of the wellbore drilled by the drill bit may be defined by the cutting structures disposed at the largest outer diameter of the drill bit.

The drill bit is coupled, either directly or indirectly, to an end of what is referred to in the art as a "drill string," which comprises a series of elongated tubular segments connected end-to-end that extends into the wellbore from the surface of the formation. Often various tools and components, including the drill bit, may be coupled together at the distal end of the drill string at the bottom of the wellbore being drilled. This assembly of tools and components is referred to in the art as a "bottom hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may comprise, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

It is known in the art to use what are referred to as "reamer" devices (also referred to in the art as "hole opening devices" or "hole openers") in conjunction with a drill bit as part of a bottom hole assembly when drilling a wellbore in a subterranean formation. In such a configuration, the drill bit operates as a "pilot" bit to form a pilot bore in the subterranean formation. As the drill bit and bottom hole assembly advances into the formation, the reamer device follows the drill bit through the pilot bore and enlarges the diameter of, or "reams," the pilot bore.

The bodies of downhole tools, such as drill bits and reamers, are often provided with fluid courses, such as "junk slots," to allow drilling mud (which may include drilling fluid and formation cuttings generated by the tools that are entrained within the fluid) to pass upwardly around the bodies of the tools into the annular space within the wellbore above the tools outside the drill string. Drilling tools used for casing and liner drilling usually have smaller fluid courses and are particularly prone to balling, causing a lower rate of penetration.

When drilling a wellbore, the formation cuttings may adhere to, or "ball" on, the surface of the drill bit, reamer, or other downhole tool. The cuttings may accumulate on the cutting elements and the surfaces of the drill bit or other tool, and may collect in any void, gap, or recess created between the various structural components of the bit. This phenomenon is particularly enhanced in formations that fail plastically, such as in certain shales, mudstones, siltstones, limestones, and other relatively ductile formations. The cuttings from such formations may become mechanically packed in the aforementioned voids, gaps, or recesses of the drill bit. In other cases, such as when drilling certain shale formations, the adhesion between formation cuttings and a surface of a drill bit or other tool may be at least partially based on chemical bonds therebetween. When a surface of a drill bit becomes wet with water in such formations, the bit surface and clay layers of the shale may share common electrons. A similar sharing of electrons is present between the individual sheets of the shale itself. A result of this sharing of electrons is an adhesive-type bond between the shale and the bit surface. Adhesion between the formation cuttings and the bit surface may also occur when the charge of the bit face is opposite the charge of the formation. The oppositely charged formation particles may adhere to the surface of the bit. Moreover, particles of the formation may be compacted onto surfaces of the bit or mechanically bonded into pits or trenches etched into the bit by erosion and abrasion during the drilling process.

Similarly, tools and other assemblies and components used downhole during the completion and production phases of the wellbore can be subject to scale buildup and balling over time. The buildup of scale and balling can lead to decreased operational efficiency, increased power consumption, and/or decreased usable lifetime for such downhole equipment.

Some materials may be formed over surfaces of downhole tools to reduce the tendency of scale buildup and balling. However, conventional materials that are used may be hydrophobic, but may not be wear-resistant and erosion-resistant, or they may be wear-resistant but may not be hydrophobic. Hydrophobic materials may be formed over surfaces of downhole tools, but may not be sufficiently bonded to the underlying downhole tool, may exhibit a relatively low bond strength to the underlying downhole tool surface, and may, therefore, chip, erode, or otherwise detach from the underlying downhole tool, decreasing the usable lifetime for the tool.

BRIEF SUMMARY

Embodiments disclosed herein include downhole tools including hydrophobic materials over a body thereof. For example, in accordance with one embodiment, a downhole tool comprises a body having a composition, a layer of hydrophobic material metallurgically bonded to a surface of the body, the layer of material comprising a discontinuous phase comprising a metal boride and a first continuous phase comprising a metal binder, and an interface between the layer of hydrophobic material and the body comprising the metal boride dispersed within a second continuous phase, the second continuous phase comprising the metal binder and the composition of the body.

In further embodiments, a method of forming a downhole tool comprises forming a hydrophobic material comprising a discontinuous phase comprising a metal boride dispersed within a continuous metallic binder phase over a body of a downhole tool to metallurgically bond the hydrophobic material to the body of the downhole tool.

In yet further embodiments, a method of drilling a wellbore comprises coupling a drill string to a drill bit including a hydrophobic material over at least a portion of an exterior surface of the drill bit, the hydrophobic material comprising a metal boride dispersed within a continuous metallic binder phase, advancing the drill string with the drill bit into a wellbore, rotating the drill bit within the wellbore, and removing portions of the formation to enlarge the wellbore.

DETAILED DESCRIPTION

Figure 1:
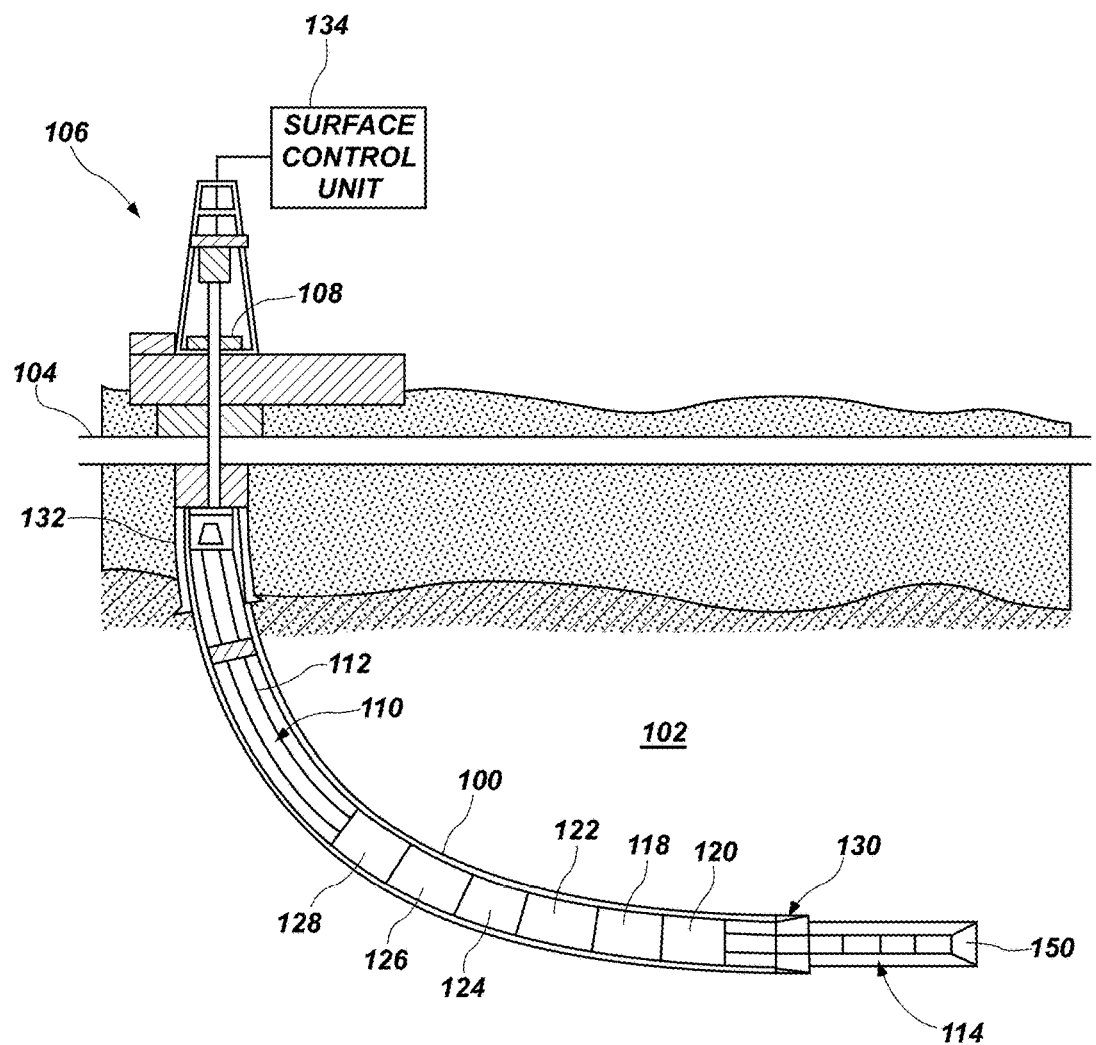
FIG. 1 is a simplified and schematically illustrated cross-sectional side view illustrating various downhole tools within a wellbore in a subterranean formation.

Illustrations presented herein are not meant to be actual views of any particular material, component, or system, but are merely idealized representations that are employed to describe embodiments of the disclosure.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for forming hydrophobic materials over a base material. Only those process acts and structures necessary to understand the embodiments of the disclosure are described in detail below. A person of ordinary skill in the art will understand that some process components are inherently disclosed herein and that adding various conventional process components and acts would be in accord with the disclosure. Additional acts or materials to form a hydrophobic material over a base material and form a metallurgical bond therebetween may be performed by conventional techniques.

As discussed in further detail below, embodiments of the disclosure relate to downhole tools for use in wellbores. The downhole tools include a layer of material disposed at a surface of a body of the downhole tool that is relatively hydrophobic, and additionally, may be relatively wear-resistant and/or erosion-resistant. The layer of material may have a composition that differs from a composition of the body over which it is exposed. The layer of material may include, for example, a composite material, such as a particle-matrix material including a discontinuous phase of hard particles dispersed within a first continuous phase. The discontinuous phase may include hard particles of a ceramic material, such as a metal boride. The metal boride may be a transition metal boride, such as at least one of a nickel boride, a cobalt boride, an iron boride, a manganese boride, a tungsten boride, a titanium boride, and a molybdenum boride. In some embodiments, the metal boride is molybdenum boride. The first continuous phase may include a metallic binder, such as chromium, cobalt, nickel, zinc, iron, tungsten, titanium, aluminum, magnesium, copper, and combinations thereof. An interface between the layer of material and the body may include a composite material of a discontinuous phase of the hard particles dispersed within a second continuous phase comprising the material of the body and the metallic binder.

The layer of material may be formed over the body and may be thermally treated to form chemical bonds (e.g., atoms of the layer of material and atoms of the body may be metallurgically bonded to each other in a crystal structure) with the material of the body. The interface between the layer of material and the body may include a gradient of the material of the body and the material of the layer of material. The interface may be substantially free of voids and include lattice structures (e.g., crystals) of the material of the body and of the layer of material.

As used herein, the term "body" of a downhole tool means and includes not only a primary body, housing, or other structure of a downhole tool, but a component part of such downhole tool, whether or not such component part is separately formed from another component part, or integral therewith. In other words, a body of a downhole tool having a layer of material on only a portion thereof according to an embodiment of the disclosure is encompassed by the disclosure. Similarly, a surface of a downhole tool having a layer of material thereon according to an embodiment of the disclosure may be an interior surface, an exterior surface, or a surface extending from an interior to an exterior of the downhole tool.

FIG. 1 is a schematic diagram showing a wellbore 100 formed in a subterranean formation 102. The wellbore 100 shown in FIG. 1 is a partially formed wellbore 100 that is currently undergoing further drilling to extend a depth of the wellbore 100, as well as enlargement of a diameter of the wellbore 100. Thus, a drilling system 106 used to form the wellbore 100 includes components at a surface 104 of the formation 102, as well as components that extend into, or are disposed within the wellbore 100. The drilling system 106 includes a rig 108 at the surface 104 of the formation 102, and a drill string 110 extending into the formation 102 from the rig 108. The drill string 110 includes a tubular member 112 that carries a bottomhole assembly (BHA) 114 at a distal end thereof. The tubular member 112 may be made up by joining drill pipe sections in an end-to-end configuration.

The BHA 114 may include, as non-limiting examples, a drill bit 150, a steering device 118, a drilling motor 120, a sensor sub 122, a bidirectional communication and power module (BCPM) 124, a stabilizer 126, a formation evaluation (FE) module 128, and a hole enlargement device 130.

The BHA 114 may be rotated within the wellbore 100 using the drilling motor 120. The drilling motor 120 may comprise, for example, a hydraulic Moineau-type motor having a shaft, to which the BHA 110 is coupled, that may be caused to rotate by pumping fluid (e.g., drilling mud or fluid) from the surface 104 of the formation 102 down through the center of the drill string 110, through the drilling motor 120, out through nozzles in the drill bit 150, and back up to the surface 104 of the formation 102 through the annular space between the outer surface of the drill string 110 and the exposed surface of the formation 102 within the wellbore 100 (or the exposed inner surface of any casing 132 within the wellbore 100). Alternatively, the BHA 110 may be rotated within the wellbore 100 by rotating the drill string 106 from the surface 104 of the formation 102.

A controller 134 may be placed at the surface 104 for receiving and processing downhole data. The controller 134 may include a processor, a storage device for storing data, and computer programs. The processor accesses the data and programs from the storage device and executes the instructions contained in the programs to control the drilling system 106 during drilling operations.

As is also shown in FIG. 1, one or more sections of casing 132 may also be disposed within one or more sections of the wellbore 100.

Embodiments of the disclosure may include any downhole tool employed within the wellbore 100 in the formation 102, such as any of the tools disposed within the wellbore 100 as previously described. Furthermore, downhole tools include those used in the formation 102 and enlargement of wellbores 100, as well as those used in the completion of wellbores 100, and operation of completed wellbores 100 for production. As used herein, the term "downhole tool" means and includes any man-made element that is inserted into a wellbore 100, or intended for use within a wellbore 100, in the forming of, enlargement of, completion of, maintenance of, remediation of, or operation of (i.e., production of) a wellbore 100.

Figure 2:
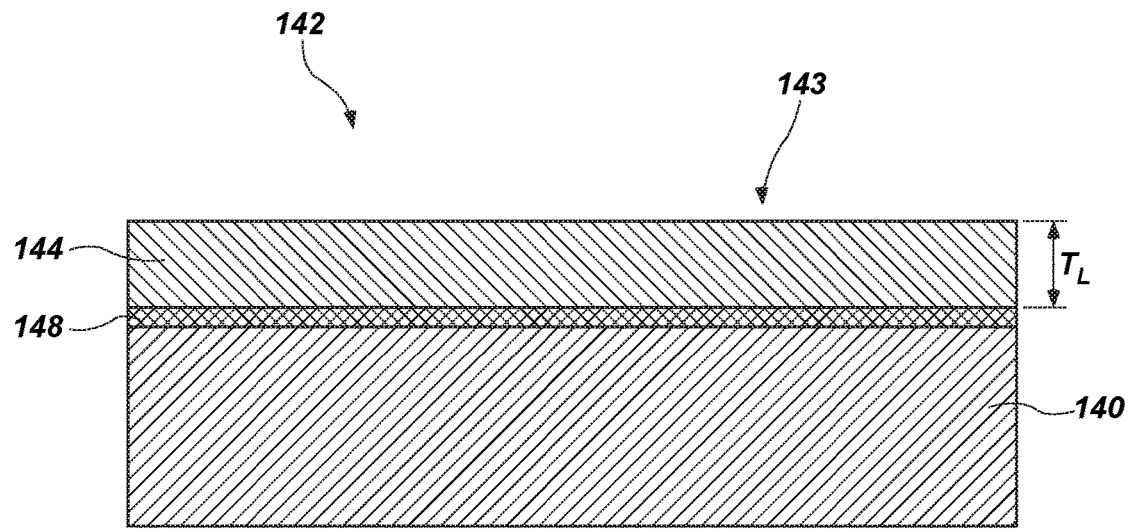
FIG. 2 is a simplified and schematically illustrated side view of a portion of a body of a downhole tool that includes a layer of material at a surface of a body of the downhole tool.

FIG. 2 is a simplified and schematically illustrated cross-sectional side view of a body 140 of an earth-boring tool 142. A layer of material 144 is disposed proximate the surface 143 of the earth-boring tool 142. The body 140 of the earth-boring tool 142 has a first composition, and the layer of material 144 has a second composition differing from the first composition of the body 140. The layer of material 144 may exhibit a hydrophobicity that is greater than a hydrophobicity of the body 140. The layer of material 144 may have an average layer thickness $T_L$ of between about 3 μm and about 1,500 μm, such as between about 3 μm and about 10 μm, between about 10 μm and about 25 μm, between about 25 μm and about 50 μm, between about 50 μm and about 100 μm, between about 100 μm and about 500 μm, between about 500 μm and about 1,000 μm, or between about 1,000 μm and about 1,500 μm. An interface 148 between the layer of material 144 and the body 140 may include a composite material of the body 140 and the layer of material 144 where the layer of material 144 is metallurgically bonded to the body 140.

As non-limiting examples, the body 140 may comprise a metal, a metal alloy, a ceramic, a superabrasive material, or a composite material. As non-limiting specific examples, the body 140 may comprise an iron alloy (e.g., steel, stainless steel, etc.), a cemented tungsten carbide composite material (e.g., cobalt-cemented tungsten carbide), or polycrystalline diamond.

As previously mentioned, the layer of material 144 may include a particle-matrix composite material of a discontinuous phase of hard particles dispersed within a continuous phase. The discontinuous phase may include hard particles of a ceramic material, such as a metal boride. The metal boride may include a transition metal boride, such as at least one of a nickel boride, a cobalt boride, an iron boride, a manganese boride, a tungsten boride, a titanium boride, and a molybdenum boride. The continuous phase may include a metallic binder, such as chromium, cobalt, nickel, zinc, iron, tungsten, titanium, aluminum, magnesium, copper, and combinations thereof. In some embodiments, the continuous phase metallic binder includes chromium and at least one of cobalt, nickel, zinc, iron, tungsten, titanium, aluminum, magnesium, and copper.

In some embodiments, the layer of material 144 includes a composite of molybdenum boride dispersed within a metallic binder material, such as cobalt-chromium (CoCr), nickel-chromium (NiCr), and combinations thereof. In yet other embodiments, the layer of material 144 includes a composite of molybdenum boride dispersed within a continuous phase of cobalt, nickel, and chromium.

The layer of material 144 may include between about 40.0 weight percent and about 80.0 weight percent of the discontinuous phase dispersed within the continuous phase. Thus, the discontinuous phase may constitute between about 40.0 weight percent and about 80.0 weight percent of the layer of material 144, such as between about 40.0 weight percent and about 50.0 weight percent, between about 50.0 weight percent and about 60.0 weight percent, between about 60.0 weight percent and about 70.0 weight percent, or between about 70.0 weight percent and about 80.0 weight percent of the layer of material 144. In some embodiments, the discontinuous phase constitutes between about 56.0 weight percent and about 62.0 weight percent of the layer of material 144. The continuous phase may constitute between about 20.0 weight percent and about 60.0 weight percent of the layer of material 144, such as between about 20.0 weight percent and about 30.0 weight percent, between about 30.0 weight percent and about 40.0 weight percent, between about 40.0 weight percent and about 50.0 weight percent, or between about 50.0 weight percent and about 60.0 weight percent of the layer of material 144. In some embodiments, the continuous phase constitutes between about 38.0 weight percent and about 44.0 weight percent of the layer of material 144.

The continuous phase may include between about 62.0 weight percent and about 68.0 weight percent cobalt and between about 32.0 weight percent and about 38.0 weight percent chromium. In other embodiments, the continuous phase includes between about 62.0 weight percent and about 68.0 weight percent nickel and between about 32.0 weight percent and about 38.0 weight percent chromium. In yet other embodiments, the continuous phase comprises between about 32.0 weight percent and about 38.0 weight percent chromium and between about 62.0 weight percent and about 68.0 weight percent of at least one of cobalt, nickel, zinc, iron, tungsten, titanium, aluminum, magnesium, and copper.

The continuous phase may have a liquidus temperature between about 1,000° C. and about 2,000° C., such as between about 1,000° C. and about 1,200° C., between about 1,200° C. and about 1,400° C., between about 1,400° C. and about 1,600° C., between about 1,600° C. and about 1,800° C., or between about 1,800° C. and about 2,000° C.

The interface 148 may include a composite of the discontinuous phase (e.g., the metal boride) dispersed within a second continuous phase including the metallic binder and material of the body 140. The interface 148 may include a gradient of the discontinuous phase. Portions of the interface 148 distal from the body 140 may include higher amounts of the discontinuous phase than portions of the interface 148 directly proximate to the body 140. The interface 148 may also include a gradient of the metallic binder continuous phase. Portions of the interface 148 distal from the body 140 may include higher amounts of the metallic binder than portions of the interface 148 directly proximate the body 140. In some embodiments, the interface 148 may include a gradient of the material of the body 140 with a higher amount of the material of the body directly proximate the body 140 and lower amounts of the material of the body 140 distal from the body 140.

Thus, the interface 148 may include a discontinuous phase of the hard particles dispersed within a continuous phase that includes the binder material of the layer of material 144 and the material of the body 140. In embodiments where the body 140 includes a composite material, the discontinuous phase at the interface 148 may also include hard particles of the body 140. The material of the body 140 may constitute up to about ten weight percent of the discontinuous phase of the interface 148. For example, the material of the body 140 may constitute between about zero weight percent and about ten weight percent, such as between about zero weight percent and about five weight percent, or between about five weight percent and about ten weight percent of the discontinuous phase of the interface 148. Similarly, the material of the body 140 may constitute between about one weight percent and about five weight percent, or between about five weight percent and about ten weight percent of the discontinuous phase of the interface 148. In some embodiments, where the body 140 comprises iron or an iron-based alloy, the interface 148 may include between about one weight percent and about ten weight percent iron or the iron-based alloy. The amount of iron may decrease from the body 140 through the interface 148 and may be approximately zero at the layer of material 144.

The layer of material 144 may exhibit an increased bond strength to the body 140 as compared to conventional materials that are only physically (i.e., mechanically) attached to a body. The layer of material 144 may have a bond strength (e.g., the stress required to separate the layer of material 144 from the body 140) of between about 10,000 psi and about 20,000 psi, such as about 10,000 psi and 12,000 psi, between about 12,000 psi and about 14,000 psi, between about 14,000 psi and about 16,000 psi, between about 16,000 psi and about 18,000 psi, or between about 18,000 psi and about 20,000 psi.

The layer of material 144 may be relatively wear-resistant, erosion-resistant, and may exhibit non-stick and/or low friction properties.

The layer of material 144 may exhibit an Ra surface roughness of between about 60 μin and about 150 μin, such as between about 70 μin, and about 90 μin, or between about 110 μin and about 150 μin, such as between about 120 μin and about 140 μin, and a Vickers microhardness $HV_{0.3}$ of at least about 1,600 $HV_{0.3}$, such as at least about 2,000 $HV_{0.3}$.

The layer of material 144 may be formed on the body 140 by depositing the layer of material 144 on the body 140 followed by thermally treating the layer of material 144 and the body 140 to induce metallurgical bonds between the layer of material 144 and the body 140 at the interface 148. Thermally treating the layer of material 144 and the surface of the body 140 may induce recrystallization and grain growth at the interface 148, creating an increased bond strength between the layer of material 144 and the body 140.

The layer of material 144 may be formed by various methods including thermal spraying methods such as high velocity air fuel (HVAF) spraying, high velocity oxygen fuel (HVOF) spraying, low velocity oxygen fuel (LVOF) spraying, and super high velocity oxygen fuel (SHVOF) spraying. Such thermal spraying methods may form the layer of material 144 by directing high velocity spray particles having a composition that corresponds to a composition of the layer of material 144 at a surface of the body 140. Forming the layer of material 144 by such thermal spraying processes may form the layer of material 144 to a thickness of between about 3 μm and about 1,500 μm, such as between about 3 μm and about 10 μm, between about 10 μm and about 25 μm, between about 25 μm and about 50 μm, between about 50 μm and about 100 μm, between about 100 μm and about 500 μm, between about 500 μm and about 1,000 μm, or between about 1,000 μm and about 1,500 μm.

HVAF and HVOF thermal spraying processes may partially melt the continuous phase of the layer of material 144 as the layer of material 144 is deposited onto the surface of the body 140. The body 140 may be at a lower temperature than the partially melted continuous phase of the layer of material 144 and the layer of material 144 may cool rapidly as it contacts the surface of the body 140. For example, the temperature of the layer of material 144 may be as low as between about 140° C. and about 210° C. when it contacts the surface of the body 140. Thus, an interface 148 including metallurgical bonds between the layer of material 144 and the body 140 may not form between the layer of material 144 and the surface of the body 140. Rather, the layer of material 144 may only be physically bonded to the body 140.

Figure 3:
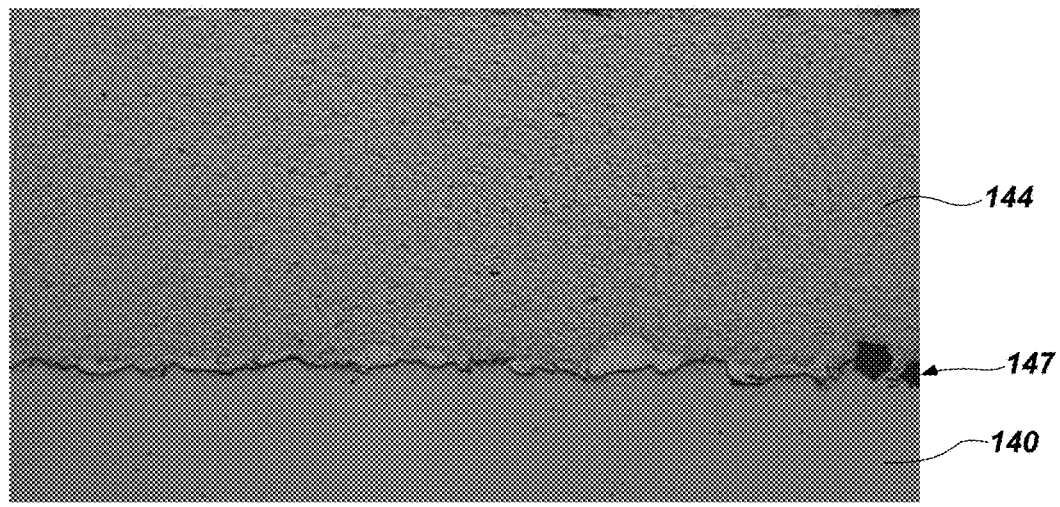
FIG. 3 is a micrograph depicting a layer of material that is only physically attached to an underlying body.

FIG. 3 is a micrograph showing the layer of material 144 over the body 140 as deposited by HVAF. An interface 147 between the body 140 and the layer of material 144 may not include metallurgical bonds between the layer of material 144 and the body 140. Rather, as seen in FIG. 3, the interface 147 includes a distinct boundary between the body 140 and the layer of material 144, without recrystallization of the body 140 and the layer of material 144. The layer of material 144 may be prone to detach from the body 140 at the interface 147 because of the weak physical attachment of the layer of material 144 to the body 140.

After depositing the layer of material 144 onto the body 140, the layer of material 144 may be heat treated to induce recrystallization and grain growth between the body 140 and the layer of material 144 at the interface 148. The layer of material 144 may be metallurgically bonded to the underlying body 140 by heating the layer of material 144 and the surface of the body 140 directly adjacent the layer of material 144. The layer of material 144 and the surface of the body 140 directly adjacent the layer of material 144 may be heated to about a liquidus temperature of the continuous phase of the layer of material 144 or to above a liquidus temperature of the continuous phase of the layer of material 144. The continuous phase of the layer of material 144 and material at the surface of the body 140 may recrystallize during the heat treatment. In some embodiments, the layer of material 144 is heated to a temperature between about 1,000° C. and about 2,000° C., such as between about 1,000° C. and about 1,200° C., between about 1,200° C. and about 1,400° C., between about 1,400° C. and about 1,600° C., between about 1,600° C. and about 1,800° C., or between about 1,800° C. and about 2,000° C.

At least one of a portion of the body 140 and a portion of the layer of material 144 may be melted and dispersed within the other of the portion of the body 140 and the portion of the layer of material 144. The material of the body 140 may be diffused into the material of the layer of material 144. In some embodiments, the layer of material 144 and the surface of the body 140 may be heated to a liquidus temperature of the continuous phase of the layer of material 144. The diffused material of the body 140 may recrystallize at the interface 148 during the heat treatment.

The layer of material 144 and the surface of the body 140 may be heated by a heating source such as least one of a plasma torch, an oxygen/acetylene (oxyacetylene) torch, a laser heating source, an induction heating source, or any other suitable heating source for providing localized heat where the layer of material 144 contacts the surface of the body 140. The heating source may heat the continuous phase of the layer of material 144 to about a liquidus temperature of the continuous phase of the layer of material 144 or to above the liquidus temperature of the continuous phase of the layer of material 144. The heating source may also heat localized regions of the body 140 directly adjacent the layer of material 144 to about a liquidus temperature of the continuous phase of the layer of material 144 or to above the liquidus temperature of the continuous phase of the layer of material 144.

As the layer of material 144 and the surface of the body 140 cool after being heated, the layer of material 144 and the body 140 may recrystallize at the interface 148. Thus, in some embodiments, the layer of material 144 may have a first crystalline microstructure, the body 140 may have a second crystalline microstructure different from the first crystalline microstructure, and the interface 148 may include a third crystalline microstructure different from the first crystalline microstructure and the second crystalline microstructure.

Figure 4:
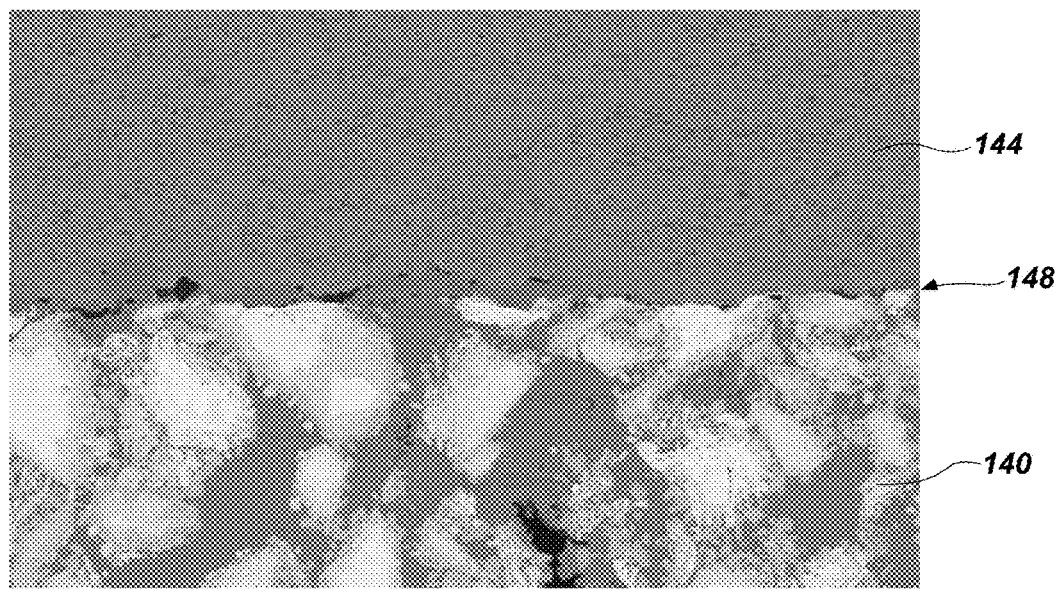
FIG. 4 is a micrograph depicting a layer of material metallurgically bonded to an underlying body.

A micrograph showing the interface 148 between the layer of material 144 and the body 140 after heat treatment is shown in FIG. 4. As described above, the interface 148 may include metallurgical bonds between the layer of material 144 and the body 140. As shown in FIG. 4, there is not a distinct boundary between the body 140 and the layer of material 144. Rather, the interface 148 includes metallurgical bonds between the layer of material 144 and the body 140 because of recrystallization and grain growth at the interface 148.

In another embodiment, metallurgical bonds at the interface 148 may form as the layer of material 144 is deposited onto the body 140. The layer of material 144 may be deposited onto the body 140 at a temperature of about the liquidus temperature of the continuous phase of the layer of material 144 or at a temperature above the liquidus temperature of the continuous phase of the layer of material 144. Thus, the interface 148 may be formed at the same time that the layer of material 144 is deposited onto the surface of the body 140.

A powder having a composition corresponding to the composition of the layer of material 144 may be formed. The powder may include the same composition as the layer of material 144 as described above. For example, the powder may include between about 56.0 weight percent and about 62.0 weight percent of the discontinuous phase dispersed within the continuous phase. The layer of material 144 may include between about 38.0 weight percent and about 44 weight percent of the continuous phase of the metallic binder. The continuous phase may include the same materials as previously described. In some embodiments, the powder includes between about 56.3 weight percent and about 62.0 weight percent molybdenum boride, between about 13.5 weight percent and about 15.1 weight percent chromium, and between about 25.0 weight percent and about 28.1 weight percent of at least one of cobalt, nickel, zinc, iron, tungsten, titanium, aluminum, magnesium, and copper.

The powder may be formed to various sizes by passing the powder through a screen having a particular mesh size. In some embodiments, a mixture of molybdenum boride, chromium, and at least one of cobalt, nickel, zinc, iron, tungsten, titanium, aluminum, magnesium, and copper are powderized and passed through a screen having a mesh size of about 5 μm, 38 μm (No. 400 ASTM mesh), 45 μm (No. 325 ASTM mesh), 75 μm (No. 200 ASTM mesh), 125 μm (No. 115 ASTM mesh), 250 μm (No. 60 ASTM mesh), and about 500 μm (No. 35 ASTM mesh). Thus, the powder may have particle sizes between about 5 μm and about 500 μm, such as between about 5 μm and about 38 μm, between about 38 μm and about 45 μm, between about 45 μm and about 75 μm, between about 75 μm and about 125 μm, between about 125 μm and about 250 μm, and between about 250 μm and about 500 μm.

In one embodiment, the powder may be deposited onto a substrate (e.g., the body 140) by plasma transfer arc (PTA) welding to form the layer of material 144. PTA may form the layer of material 144 to a thickness of between about 60 μm and about 120 μm per layer. In some embodiments between about one and about five layers of the layer of material 144 may be deposited by PTA. In the PTA process, a high-energy plasma arc may melt the surface of the body 140. The surface of the body 140 may be heated to above a liquidus temperature of the body 140 at regions directly proximate where the layer of material 144 is deposited onto the body 140. The powder may be flowed through the arc and may be molten as it contacts the surface of the body 140. Because the layer of material 144 is deposited above a liquidus temperature of the continuous phase of the layer of material 144, the interface 148 is formed at the same time that the layer of material 144 is deposited onto the body 140. Accordingly, the interface 148 between the body 140 and the layer of material 144 may be formed by PTA without heating the body 140 or the layer of material 144 after the powder of the layer of material 144 is applied to the body 140.

In another embodiment, the powder may be applied to the body 140 in a laser powder deposition welding process (also known as laser metal deposition (LMD)). The powder may be directed to a surface of the body 140 and a laser may melt the powder as it is applied to the body 140. The laser creates localized heat where the powder contacts the body 140 and heats the powder to above a liquidus temperature of the continuous phase of the layer of material 144. The melted powder may form a deposit on a surface of the body 140 that is metallurgically bonded to the body 140. Laser weld deposition may form the layer of material 144 to a thickness of between about 45 μm and about 250 μm per layer. In some embodiments, between about one and about five layers of material may be formed by laser deposition.

In yet other embodiments, the powder may be formed into a rod, such as a welding rod. The rod may be suitable for applying the powdered material to the body 140, such as by oxy-fuel welding (oxyacetylene welding, oxy welding, or gas welding), tungsten inert gas (TIG) welding, metal inert gas (MIG) welding, laser welding, or other welding methods. Thus, in some embodiments, the layer of material 144 may be formed by forming a welding rod having the same composition as the layer of material 144 and then welding the layer of material 144 to the body 140 using the welding rod.

As previously mentioned, the body 140 shown in FIG. 2 may include a body 140 of any downhole tool 142. As non-limiting examples, the body 140 may include a component of a downhole tool 142 in the form of a drill bit (e.g., a fixed-cutter drill bit, a rolling cutter drill bit, a hybrid fixed-cutter and rolling cutter drill bit, etc.), a core bit, an expandable bit, an eccentric bit, a bicenter bit, a fixed blade reamer (e.g., a reamer wing), an expandable reamer, a stabilizer, an artificial lift valve, a tooth of a drill bit, a cutting structure of a drill bit, a subsurface safety valve, a sensor tool (e.g., a measurement while drilling (MWD) tool or a logging while drilling (LWD) tool), a drill collar, casing, liner, so-called "fishing" tools and equipment, a downhole motor, a rotor or stator for a mud motor, a sensor plate for a mud pulse device, a bit sub (e.g., designed to be inserted between a drill collar and a bit), and downhole completion, production, and maintenance/remediation equipment, assemblies and components (e.g., blow out preventers, valves, diverters, down-hole pumps, screens, etc.).

Figure 5:
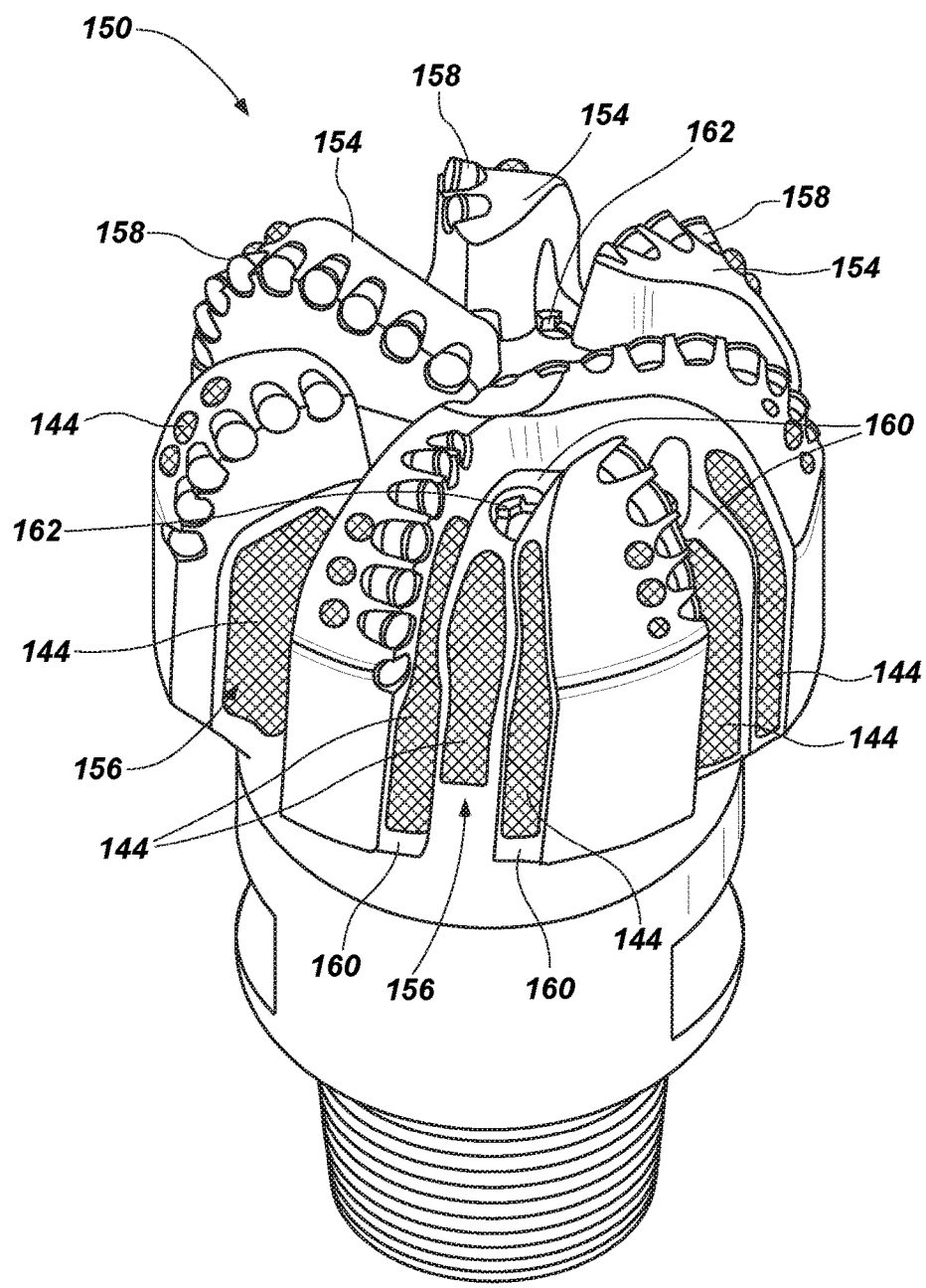
FIG. 5 illustrates a perspective view of a downhole tool in the form of an earth-boring rotary drag bit that includes a layer of material as described herein and illustrated in FIG. 2 at a surface of a bit body of the earth-boring rotary drag bit.

As one non-limiting example of one such downhole tool, FIG. 5 illustrates an earth-boring rotary drag bit 150 according to the present disclosure. The drag bit 150 has a bit body 140 (FIG. 2) that includes a plurality of blades 154 separated from one another by fluid courses 156. The portions of the fluid courses 156 that extend along the radial sides (the "gage" areas of the drill bit 150) are often referred to in the art as "junk slots." A plurality of cutting elements 158 are mounted to each of the blades 154. The bit body 140 further includes a generally cylindrical internal fluid plenum and fluid passageways that extend through the bit body 140 to an exterior surface 160 of the bit body 140. Nozzles 162 may be secured within the fluid passageways proximate the exterior surface 160 of the bit body 140 for controlling the hydraulics of the drill bit 150 during drilling.

During a drilling operation, the drill bit 150 may be coupled to a drill string 110 (FIG. 1). As the drill bit 150 is rotated within the wellbore 100, drilling fluid may be pumped down the drill string 110, through the internal fluid plenum and fluid passageways within the bit body 140 of the drill bit 150, and out from the drill bit 150 through the nozzles 162. Formation cuttings generated by the cutting elements 158 of the drill bit 150 may be carried with the drilling fluid through the fluid courses 156, around the drill bit 150, and back up the wellbore 100 through the annular space within the wellbore 100 and outside the drill string 110.

As shown in FIG. 5, a layer of material 144, which is represented in FIG. 3 by the cross-hatched areas for purposes of illustration, may be disposed over at least a portion of the exterior surface 160 of the bit body 140. The layer of material 144, due to its hydrophobicity, may reduce accumulation of formation cuttings thereon when the drill bit 150 is used to form a wellbore 100. The layer of material 144 may be provided at, for example, regions of the drill bit 150 that are susceptible to balling, such as pinch points (e.g., locations toward which blades converge), cuttings trajectory points (e.g., locations at which formation cuttings converge), and bit shank (i.e., where the bit head and threaded pin meet). For example, the layer of material 144 may be disposed over one or more regions of the exterior surface 160 of the bit body 140 of the drill bit 150 within the fluid courses 156, as shown in FIG. 5. Such regions may include, for example, rotationally leading surfaces of the blades 154, rotationally trailing surfaces of the blades 154, under the cutting elements 158 where chip flow occurs, and behind the cutting elements 158. In additional embodiments, the layer of material 144 may form a generally continuous coating disposed over at least substantially all exterior surfaces of the bit body 140 of the drill bit 150. The bit body 140 and the layer of material 144 may have a boride composition as previously described herein with reference to FIG. 2.

The layers of material 144 described herein may provide enhanced resistance to scale buildup and balling in or on tools used in downhole environments, while maintaining desirable levels of wear-resistance and erosion-resistance. Thus, by employing such layers of material on downhole tools, power consumption may be reduced, operational efficiency may be increased, and/or the serviceable life of the downhole tools may be extended. The layer of material 144 may be integral and chemically attached to the body 140 and may remain attached to the body 140 longer than a conventional hydrophobic material that is only physically attached to the body 140.

Additional non-limiting example embodiments of the disclosure are set forth below.

Embodiment 1

A downhole tool comprising: a body having a composition; a layer of hydrophobic material metallurgically bonded to a surface of the body, the layer of material comprising a discontinuous phase comprising a metal boride and a first continuous phase comprising a metal binder; and an interface between the layer of hydrophobic material and the body comprising the metal boride dispersed within a second continuous phase, the second discontinuous phase comprising the metal binder and the composition of the body.

Embodiment 2

The downhole tool of Embodiment 1, wherein the metal boride comprises a transition metal boride comprising at least one of a nickel boride, a cobalt boride, an iron boride, a manganese boride, a tungsten boride, a titanium boride, a molybdenum boride.

Embodiment 3

The downhole tool of Embodiment 1, wherein the layer of hydrophobic material comprises chromium and at least one of cobalt, nickel, zinc, iron, tungsten, titanium, aluminum, magnesium, and copper.

Embodiment 4

The downhole tool of any one of Embodiments 1 through 3, wherein the metal boride comprises molybdenum boride and the first continuous phase comprises cobalt-chromium.

Embodiment 5

The downhole tool of any one of Embodiments 1 through 3, wherein the metal boride comprises molybdenum boride and the first continuous phase comprises nickel-chromium.

Embodiment 6

The downhole tool of any one of Embodiments 1 through 3, wherein the discontinuous phase constitutes between about 40.0 weight percent and about 80.0 weight percent of the layer of hydrophobic material.

Embodiment 7

The downhole tool of any one of Embodiments 1 through 3, wherein the continuous phase constitutes between about 20.0 weight percent and about 60.0 weight percent of the layer of hydrophobic material.

Embodiment 8

The downhole tool of any one of Embodiments 1 through 7, wherein the layer of hydrophobic material has a thickness of between about 3 μm and about 1,500 μm.

Embodiment 9

The downhole tool of any one of Embodiments 1 through 8, wherein the layer of hydrophobic material is wear-resistant and erosion-resistant.

Embodiment 10

The downhole tool of any one of Embodiments 1 through 9, wherein the interface between the layer of hydrophobic material and the body comprises a gradient of the metal boride, portions of the interface distal from the body including a higher amount of the metal boride than portions of the interface directly proximate the body.

Embodiment 11

The downhole tool of any one of Embodiments 1 through 10, wherein the second continuous phase comprises up to about ten weight percent of the material of the body.

Embodiment 12

The downhole tool of any one of Embodiments 1 through 10, wherein the interface between the layer of hydrophobic material and the body comprises a gradient of the composition, portions of the interface directly proximate the body have a higher amount of the composition than portions of the interface distal from the body.

Embodiment 13

The downhole tool of any one of Embodiments 1 through 12, wherein the layer of material comprises a higher liquidus temperature than the composition.

Embodiment 14

The downhole tool of any one of Embodiments 1 through 13, wherein the body comprises a component of a downhole tool selected from the group consisting of a drill bit, a core bit, an expandable bit, an eccentric bit, a bicenter bit, a fixed blade reamer, an expandable reamer, a stabilizer, an artificial lift valve, a tooth of a drill bit, a cutting structure of a drill bit, a subsurface safety valve, a sensor tool, a drill collar, casing, liner, a downhole motor, a rotor, a stator, a sensor plate, a bit sub, and equipment, assemblies, and components for downhole completion, production, maintenance, and remediation.

Embodiment 15

A method of forming a downhole tool as recited in any one of Embodiments 1 through 14.

Embodiment 16

A method for forming a downhole tool, the method comprising forming a hydrophobic material comprising a discontinuous phase comprising a metal boride dispersed within a continuous metallic binder phase over a body of a downhole tool to metallurgically bond the hydrophobic material to the body of the downhole tool.

Embodiment 17

The method of Embodiment 16, wherein forming a hydrophobic material comprises forming the hydrophobic material by at least one of HVAF and HVOF.

Embodiment 18

The method of any one of Embodiments 17 and 18, further comprising heating the hydrophobic material to above a liquidus temperature of the continuous metallic binder phase.

Embodiment 19

The method of Embodiment 16, wherein forming a hydrophobic material comprising a discontinuous phase comprising a metal boride dispersed within a continuous metallic binder phase over a body comprises forming the hydrophobic material over the body by at least one of plasma transferred arc welding, laser deposition welding, and oxy-acetylene welding.

Embodiment 20

The method of any one of Embodiments 16 through 19, further comprising forming an interface between the body and the hydrophobic material to have a gradient of the metallic binder phase, portions of the interface distal from the body including a higher amount of the continuous metallic binder phase than portions of the interface directly proximate the body.

Embodiment 21

A method of drilling a wellbore, the method comprising coupling a drill string to a drill bit including a hydrophobic material over at least a portion of an exterior surface of the drill bit, the hydrophobic material comprising a metal boride dispersed within a continuous metallic binder phase, advancing the drill string with the drill bit into a wellbore, rotating the drill bit within the wellbore, and removing portions of the formation to enlarge the wellbore.

Although the foregoing description contains many specifics, these are not to be construed as limiting the scope of the disclosure, but merely as providing certain embodiments. Similarly, other embodiments may be devised which do not depart from the scope of the invention. For example, features described herein with reference to one embodiment also may be provided in others of the embodiments described herein. The scope of the invention is, therefore, indicated and limited only by the appended claims and their legal equivalents, rather than by the foregoing description.

All additions, deletions, and modifications to embodiments of the disclosure, as described and illustrated herein, which fall within the meaning and scope of the claims, are encompassed by the invention.

What is claimed is:

1. A downhole tool, comprising:
a body having a composition;
a layer of hydrophobic material metallurgically bonded to a surface of the body, the layer of hydrophobic material comprising a discontinuous phase comprising molybdenum boride and a first continuous phase comprising a cobalt-chromium metal binder, the discontinuous phase constituting between about 40.0 weight percent and about 80.0 weight percent of the layer of hydrophobic material, wherein the cobalt-chromium comprises between about 62.0 weight percent and about 68.0 weight percent cobalt and between about 32.0 weight percent and about 38.0 weight percent chromium; and
an interface between the layer of hydrophobic material and the body comprising molybdenum boride dispersed within a second continuous phase, the second continuous phase comprising the cobalt-chromium and the composition of the body, wherein the composition of the body is different from the composition of the cobalt-chromium, wherein the interface exhibits a gradient of the composition of the cobalt-chromium and comprises a higher weight percent of the cobalt-chromium proximate the layer of hydrophobic material than proximate the body, wherein the interface exhibits a gradient of the composition of the body and comprises a higher weight percent of the composition of the body proximate the body than proximate the layer of hydrophobic material.

2. The downhole tool of claim 1, wherein the first continuous phase constitutes between about 20.0 weight percent and about 60.0 weight percent of the layer of hydrophobic material.

3. The downhole tool of claim 1, wherein the layer of hydrophobic material has a thickness of between about 3 µm and about 1,500 µm.

4. The downhole tool of claim 1, wherein the interface between the layer of hydrophobic material and the body comprises a gradient of the molybdenum boride, portions of the interface distal from the body including a higher amount of the molybdenum boride than portions of the interface directly proximate the body.

5. The downhole tool of claim 1, wherein the second continuous phase comprises up to about ten weight percent of the material of the body.

6. The downhole tool of claim 1, wherein the layer of hydrophobic material comprises a higher liquidus temperature than the composition of the body.

7. The downhole tool of claim 1, wherein the body comprises a component of a downhole tool selected from the group consisting of a drill bit, a core bit, an expandable bit, an eccentric bit, a bicenter bit, a fixed blade reamer, an expandable reamer, a stabilizer, an artificial lift valve, a tooth of a drill bit, a cutting structure of a drill bit, a subsurface safety valve, a sensor tool, a drill collar, casing, liner, a downhole motor, a rotor, a stator, a sensor plate, a bit sub, and equipment, assemblies, and components for downhole completion, production, maintenance, and remediation.

8. The downhole tool of claim 1, wherein the first continuous phase further comprises nickel.

9. The downhole tool of claim 1, wherein the first continuous phase consists essentially of cobalt and chromium.

10. The downhole tool of claim 1, wherein the layer of hydrophobic material exhibits an Ra surface roughness of between about 60 µin and about 150 µin.

11. The downhole tool of claim 1, wherein the layer of hydrophobic material exhibits a Vickers microhardness $HV_{0.3}$ of at least about 2,000 $HV_{0.3}$.

12. The downhole tool of claim 1, wherein the layer of hydrophobic material exhibits a bond strength to the body between about 10,000 psi and about 20,000 psi.

13. A method for forming a downhole tool, the method comprising:
forming a body of a downhole tool, the body having a composition;
forming a layer of hydrophobic material metallurgically bonded to a surface of the body, the layer of hydrophobic material comprising a discontinuous phase comprising molybdenum boride dispersed within a first continuous phase comprising a cobalt-chromium metal binder over the body of the downhole tool, wherein forming the layer of hydrophobic material comprises forming the molybdenum boride to constitute between about 40.0 weight percent and about 80.0 weight percent of the layer of hydrophobic material, wherein the cobalt-chromium comprises between about 62.0 weight percent and about 68.0 weight percent cobalt and between about 32.0 weight percent and about 38.0 weight percent chromium: and forming an interface between the layer of hydrophobic material and the body, the interface comprising the molybdenum boride dispersed within a second continuous phase, the second continuous phase comprising the cobalt-chromium and the composition of the body, wherein the composition of the body is different from the composition of the cobalt-chromium, wherein the interface exhibits a gradient of the composition of the cobalt-chromium and comprises a higher weight percent of the cobalt-chromium proximate the layer of hydrophobic material than proximate the body, wherein the interface exhibits a gradient of the composition of the body and comprises a higher weight percent of the composition of the body proximate the body than proximate the layer of hydrophobic material.

14. The method of claim 13, wherein forming a layer of hydrophobic material comprises forming the layer of hydrophobic material by at least one of HVAF, HVOF, LVOF, and SHVOF.

15. The method of claim 14, further comprising heating the layer of hydrophobic material to above a liquidus temperature of the first continuous phase comprising the metal binder.

16. The method of claim 13, wherein forming a layer of hydrophobic material comprising a discontinuous phase comprising molybdenum boride dispersed within a first continuous phase comprising a cobalt-chromium metal binder over the body comprises forming the layer of hydrophobic material over the body by at least one of plasma transferred arc welding, laser deposition welding, and oxyacetylene welding.

* * * * *

UNITED STATES PATENT AND TRADEMARK OFFICE
CERTIFICATE OF CORRECTION

PATENT NO.         : 10,077,638 B2
APPLICATION NO.    : 14/496124
DATED              : September 18, 2018
INVENTOR(S)        : James L. Overstreet, Vivekanand Sista and Bo Yu It is certified that error appears in the above-identified patent and that said Letters Patent is hereby corrected as shown below:

In the Claims

Claim 13, Column 16, Line 31, change "percent chromium: and" to --percent chromium; and--

Signed and Sealed this
Sixth Day of November, 2018

Andrei Iancu
*Director of the United States Patent and Trademark Office*